United States Patent Office 3,535,303
Patented Oct. 20, 1970

3,535,303
PROCESS FOR THE PREPARATION OF UNSATURATED HYDROCARBON POLYMERS HAVING A HIGH PERCENTAGE OF VINYL OPENING CONFIGURATION
Mitsuo Ichikawa and Yasumasa Takeuchi, Yokkaichi-shi, Yoshitada Kagawa, Matsuzaka-shi, and Masayuki Endoh and Akira Kogure, Yokkaichi-shi, Japan, assignors to Japan Synthetic Rubber Co., Ltd., Tokyo, Japan, a corporation of Japan
No Drawing. Filed Aug. 5, 1968, Ser. No. 750,024
Claims priority, application Japan, Aug. 11, 1967, 42/51,249
Int. Cl. C07c 5/22
U.S. Cl. 260—94.3     13 Claims

ABSTRACT OF THE DISCLOSURE

Process for the preparation of unsaturated hydrocarbon polymers having high percentage of vinyl opening configuration by polymerizing a monomer of the formula $CH_2=CH-CR^1=CR^2R^3$ (wherein $R^1$, $R^2$ and $R^3$ each are hydrogen, alkyl or alkenyl) in the presence of a catalyst obtained by mixing
(1) a cobalt compound,
(2) a phosphine of the formula $PR^4R^5R^6$ (wherein $R^4$, $R^5$ and $R^6$ each are alkyl, aryl, halogen or hydrogen),
(3) a halogenated aluminum of the formula $$AlR^7_m X_{3-m}$$

(wherein $R^7$ is alkyl and X is halogen, $m$ being 0, 1, 1.5 or 2),
(4) an alkoxy derivative of an organoaluminum compound of the formula $AlR^8_n(OR^9)_{3-n}$ (wherein $R^8$ and $R^9$ each are alkyl, $n$ being 1 or 2).

---

The present invention relates to a process for the preparation of unsaturated hydrocarbon polymers having a high percentage of vinyl opening configuration.

For preparing a so-called 1,2-polybutadiene, that is, a butadiene polymer having vinyl configuration in a very high percentage among the three configurational modes of cis-1,4 configuration, trans-1,4 configuration and vinyl configuration, there are known the following various processes:

A process in which there is used a so-called Ziegler type catalyst containing, as one component, a transition metal compound. Typical examples of such catalysts are as follows:

(i) $V(ACAC)_3$—$AlR_3$ (wherein R represents an alkyl group and ACAC represents an acetylacetonate group) ["Chim. e Ind."; 41, 526 (1959)].
(ii) $Cr(ACAC)_3$—$AlR_3$ ["Chim. e Ind."; 41, 1163 (1959)].

These catalysts are all heterogeneous and the products contain a large proportion of low molecular weight polymers soluble in ether and acetone. The products are syndiotactic or isotactic and are not rubbery. In particular, the 1,2-content in the products obtained by using any of these catalysts is less than 90% or usually about 80%.

Besides the aforesaid catalysts, there are also known the catalysts of $Co_2(CO)_8$—$MoCl_5$ ["Kogyo Kagaku Zasshi"; 67, 1652 (1964)] and $MoCl_5$—$ZnR_2$ (U.S.P. 3,232,920), but these are all heterogeneous and a large quantity of catalyst is required to obtain a significantly high catalytic activity. Also, in order to prepare a catalyst having a high catalytic activity, the catalyst must be aged under specific conditions.

In addition, a report by Dr. E. Susa in ["J. Polymer Sci."; Part C, No. 4,399 (1963)] discloses that a cobalt compound-trialkyl aluminum catalyst provides syndiotactic 1,2-polybutadiene, but this report is clearly in error ("Ind. & Eng. Chem."; Product Research and Development, vol. 1, No. 1, page 32, March 1962). This has also been confirmed by us.

While the foregoing discussion has dealt with the polymerization catalysts of butadiene, there is known only one instance of a catalyst for polymerizing other conjugated dienes to a vinyl opening configuration. Namely, it is known that the $Ti(OR)_4$—$AlR'_3$ (wherein R and R' are alkyl) type catalyst polymerizes butadiene to a 1,2-configuration and isoprene to a 3,4-configuration. Further, it is also known that this catalyst system does not polymerize 1,3-pentadiene to a 1,2-configuration but polymerizes it to a 1,4-configuration [Makromol. Chem. 72, 126 (1964)].

Now, it is well known that the catalyst consisting of a combination of a dialkylaluminum chloride and a cobalt compound polymerizes butadiene to a cis-1,4 configuration. We however found that 1,2-polybutadiene could be obtained by combining this catalyst system with a specific organic phosphine and carrying out the polymerization in a halogenated hydrocarbon, and a patent application in respect of this discovery is pending. However, in the above-described method, the molecular weight of the resulting polymer fluctuates over a broad range depending upon the amount of water present in the polymerization system. Especially in the case where it is desired to obtain an oily low molecular weight polymer, it becomes necessary to conduct the polymerization under a substantially anhydrous state (in the order of about 5 p.p.m.). In a case such as this, the molecular weight is greatly affected by slight variations in the moisture content, and hence in large scale industrial operations it is quite difficult to constantly obtain a polymer of predetermined molecular weight.

As a result of our researches with a view to eliminating the hereinabove described drawback, there has been found an excellent catalyst system by which the diene type unsaturated hydrocarbon monomers can be polymerized to form unsaturated hydrocarbon polymers containing vinyl opening configuration in high proportion.

Thus, the present invention is directed to a process for the preparation of an unsaturated hydrocarbon polymer having a high percentage of vinyl opening configuration, which comprises contacting an unsaturated hydrocarbon monomer of 4–10 carbon atoms of the formula $$CH_2=CH-CR^1=CR^2R^3$$

wherein each of $R^1$, $R^2$ and $R^3$ is a member selected from the group consisting of hydrogen, alkyl groups of 1–6 carbon atoms and alkenyl groups of 2–6 carbon atoms, in a halogenated hydrocarbon solvent with a catalyst obtained by mixing (I) a cobalt compound;
(II) a phosphine of the formula $$PR^4R^5R^6$$

wherein each of $R^4$ $R^5$ and $R^6$ is a member selected from the group consisting of alkyl, aryl, halogen and hydrogen;
(III) an organoaluminum derivative of the formula $$AlR^7_m X_{3-m}$$

wherein $R^7$ is alkyl, X is a member selected from the group consisting of chlorine and fluorine and $m$ is one of the numbers 0, 1, 1.5 and 2; and
(IV) an alkoxy derivative of an organoaluminum compound of the formula $$AlR^8_n(OR^9)_{3-n}$$

wherein each of $R^8$ and $R^9$ represents alkyl and $n$ is an integer haivng a value of 1 or 2.

According to the process of the present invention, it becomes possible to obtain a great variety of polymers ranging from the oily low molecular weight polymers to rubbery or resinous high molecular weight polymers to rubbery or resinous high molecular weight polymers depending upon the class of the unsaturated hydrocarbon monomer. For instance, an oily low molecular weight polymer is obtained from butadiene, and in this case it is possible to obtain 1,2-polybutadiene of predetermined molecular weight stably and constantly without being affected by minor variations in the moisture content. Further, when the invented process is compared with the hereinbefore indicated process of producing 1,2-polybutadiene discovered by us, it is found to be superior in the following points. Namely, in the hereinbefore indicated process the class of organophosphines is limited and the polybutadiene having a high percentage of the cis-1,4 configuration was formed with the organophosphines containing 2 or more aryl groups, but it is found that 1,2-polybutadiene is obtained in the invention process even though the organophosphines of this class is used.

Further, the alkylaluminum dihalides and alkylaluminum sesquihalides cannot be used instead of dialkylaluminum halides in the hereinbefore indicated process, but it is found that these compounds can also be used in the process of the present invention.

The monomers useable in the present invention are the unsaturated hydrocarbons of 4–10 carbon atoms of the formula $CH_2=CH-CR^1=CR^2R^3$, wherein each $R^1$, $R^2$ and $R^3$ hydrogen, represents an alkyl group of 1–6 carbon atoms or an alkenyl group of 2–6 carbon atoms, which are the same or different. Typical of there hydrocarbons are butadiene, isoprene and 1,3-pentadiene but, besides these, included are also such as 2-ethylbutadiene-1,3 2-butylbutadiene-1,3, 2-(4-methyl - 3 - pentyl) butadiene-1,3, 4-methylpentadiene-1,3, 3-methylpentadiene-1,3, 3-methylhexadiene-1,3, 4-methylhexadiene-1,3, 2-isopropyl-butadiene-1,3, 3-ethylheptadiene-1,3, 7-dimethyloctadiene-1,3 and 5-methylheptatriene-1,3,6.

As the cobalt compound, the first component of the invention catalyst, any cobalt compound can be used but preferred are the inorganic acid salts such as cobalt chloride, cobalt bromide, cobalt iodide, cobalt nitrate, cobalt carbonate, cobalt cyanide and cobalt thiocyanide, the organic acid salts such as cobalt octenoate, cobalt naphthenate and cobalt stearate, and the complex compounds of cobalt such as cobalt trisacetylacetonate and cobalt bisacetylacetonate.

The second component of the catalyst is a phosphine of the formula $PR^4R^5R^6$, where $R^4$, $R^5$ and $R^6$, which are the same or different, are represented by either of alkyl, aryl, halogen or hydrogen. The alkyl is preferably a straight-chain, branched or cyclic, alkyl group of 1–8 carbon atoms, such as methyl, ethyl, propyl, isopropyl, butyl, isobutyl, hexyl, octyl or cyclohexyl. As the aryl, preferred are phenyl and tolyl. On the other hand, the preferred halogens include chlorine, bromine and iodine. Preferred prosphines include triethylphosphine, tripropylphosphine, tributylphosphine, triphenylphosphine, trioctylphosphine, tricyclohexylphosphine, diethylphenylphosphine, trioctylphenylphosphine, ethyldiphenylphosphine, butyldiphenylphosphine, diethylphosphine, ethylphosphine, diphenylphosphine, phenylphosphine, dichlorophenylphosphine, chlorodiphenylphosphine, cyclotetramethylenephenylphosphine, phosphorus trichloride, phosphorus tribromide and phosphorus triiodide.

The third component of the actalyst is an orgnoaluminum derivative of the formula $AlR^7{}_mX_{3-m}$, wherein $R^7$ is alkyl, X is chlorine or fluorine and $m$ is either of 0, 1, 1.5 or 2. As the alkyl, preferred are the straight-chain or branched alkyl groups of 1–8 carbon atoms, such as methyl, ethyl, propyl, butyl, hexyl and octyl. X is chlorine or fluorine, but especially preferred is chlorine. Preferred halogen derivatives include such as diethylaluminum fluoride, diethylaluminum chloride, diisobutylaluminum chloride, dihexylaluminum chloride, dioctylaluminum chloride, ethylaluminum difluoride, ethylaluminum dichloride, isobutylaluminum dichloride, ethylaluminum sesquichloride, aluminum chloride.

The fourth component of the catalyst is an alkoxy derivative of an oragnoaluminum compound of the formula $AlR^8{}_n(OR^9)_{3-n}$, wherein each of $R^8$ and $R^9$ represents an alkyl group which is the same or different, and $n$ is 1 or 2. As the alkyl group, preferred are the straight-chain or branched alkyl groups of 1–8 carbon atoms, such as methyl, ethyl, propyl, butyl, hexyl and octyl. The preferred alkoxy derivatives include such as diethylaluminum monomethoxide, diethylaluminum monoethoxide, diethylaluminum monobutoxide, diisobutylaluminum monomethoxide, diisobutylaluminum monoethoxide, diisobutylaluminum monobutoxide, ethylaluminum dimethoxide, ethylaluminum diethoxide, ethylaluminum dibutoxide, isobutylaluminum dimethoxide, isobutylaluminum diethoxide and isobutylaluminum dibutoxide.

The catalyst of the present invention is prepared by mixing the aforementioned several catalyst components of (I), (II), (III) and (IV). However, when the cobalt halides, cobalt cyanide, cobalt thiocyanide and the organic acid salts of cobalt are used as the cobalt compound since these cobalt compounds form with the phosphines a complex of the formula $CoX_2(PR^4R^5R^6)_2$, where X is halogen, —CN, —SCN or an organic acid residue, a preformed phosphine complex may also be used instead of mixing these cobalt compound and the phosphine separately. Particularly, since in this case this complex is soluble in the polymerization solvent, it is convenient in that its use in a small amount will suffice and moreover because of the content of vinyl opening configuration of the resulting polymer becomes greater. As this type of cobalt compound-phosphine complex, conveniently usable are such as cobalt chloride-bistriethylphosphine, cobalt bromide-bistriethylphosphine, cobalt iodide-bistriethylphosphine, cobalt thiocyanide-bistriethylphosphine, cobalt chloride-bistriphenylphosphine, cobalt bromide-bistriphenylphosphine, cobalt iodide-bistriphenylphosphine, cobalt cyanide-bistriphenylphosphine, cobalt chloride-bistributylphosphine, cobalt bromide-bistrioctylphosphine, cobalt bromide - bisdiethylphenylphosphine, cobalt bromide-bisethyldiphenylphosphine, cobalt chloride - diphenylphosphine, cobalt chloride-bisphenylphosphine, cobalt bromide-bisdiphenylchlorophosphine, cobalt bromide-bisphenyldichlorophosphine, cobalt iodide-bistricyclohexylphosphine and cobalt octenoate-bistriphenylphosphine.

The invention catalyst is prepared by mixing the several catalyst components in an optional order, preferably, in a halogenated hydrocarbon solvent. The catalyst may either be prepared by mixing the several components in advance of their contact with the monomer such as butadiene or by mixing the several components in a polymerization reactor in the presence of the monomer such as butadiene. While there is no particular restriction as to the temperature to be used in preparing the catalyst, it is usually conveniently carried out in a range from 0° to 50° C.

The ratio between the several components of the catalyst can be decided optionally taking into consideration the class of the several components, the polymerization conditions, the properties of the intended polymer, etc., but when the cobalt compound used is soluble, the molar ratio of Co/Al [the Al being the total amount of that of components (III) and (IV)] is of the order of 1/50–1/5000, and preferably of the order of 1/100–1/2000. On the other hand, when the cobalt compound used is insoluble, it becomes necessary to use it in a large amount, an amount about equimol to the aluminum compound being required. However, the solubility of a cobalt compound which when used alone is insoluble usually becomes greater when it is used in combination with other components.

The proportion of the phosphine, the component (II), usually becomes 2 moles per mole of the cobalt compound when it is used as a preformed phosphine complex of the cobalt compound, but generally it is used in an amount in the order of 0.5–100 moles, preferably 1.0–50 moles, per mole of the cobalt compound.

The preferred proportion of the components (III) and (IV) varies depending upon the class of each but, generally speaking, a molar ratio of component III/component IV of 1/9–9/1 is preferred.

The polymerization reaction can be carried out continuously or batch-wise by contacting the monomer with the hereinbefore described catalyst in a halogenated hydrocarbon solvent.

The amount in which the catalyst is used is usually about 0.5–500 millimoles, and preferably about 5–50 millimoles, per mole of the monomer, on a basis of the sum of the components (III) and (IV).

The polymerization temperature used usually ranges from −30° to 100° C., and preferably −10° to 80° C. There is no particular restriction as to the pressure so long as it is sufficient to maintain the reaction mixture in substantially the liquid phase.

The halogenated hydrocarbons to be used in the polymerization reaction or in the preparation of the catalyst include such as methylene chloride, chloroform, carbon tetrachloride, trichloroethylene, perchloroethylene, chlorobenzene, bromobenzene and chlorotoluene.

The polymerization reaction and the preparation of the catalyst is preferably carried out in an atmosphere of an inert gas.

When the polymerization reaction has proceeded to the prescribed stage, the reaction is terminated by the addition of a suitable polymerization terminating agent to the reaction mixture. As the polymerization terminating agent, it is possible to use a conventional short stop such as water, alcohol and organic acids, but it is preferred to use those compounds which are usually used as an antioxidant such as phenyl-beta-naphthylamine and 2,6-di-tert.-butyl-p-cresol. If the reaction mixture is brought into contact with air before the antioxidant is added, since the polymer tends to gel and be converted to an insoluble polymer, this is undesirable. Next, the resulting polymer is isolated from the reaction mixture by suitable procedures followed by drying to obtain the intended polymer.

According to the invention process, for example, an oily low molecular weight polymer is obtained from butadiene, a liquid or semi-solid polymer of relatively low molecular weight or a rubbery high molecular weight polymer is obtained from isoprene, and a rubbery or resinous high molecular weight polymer is obtained from 1,3-pentadiene.

The polymer obtained by the invention process usually contains at least 60% of vinyl opening configuration and it is possible to even obtain a polymer containing at least 99% of the vinyl opening configuration depending upon the polymerization conditions. The high molecular weight polymer varies from crystalline to amorphous depending upon the reaction conditions. The amorphous polymer of high molecular weight exhibits a rubbery character, whereas the crystalline polymer is resinous and possesses fiber-forming ability. The low molecular weight polymer is a viscous liquid which is useful as raw material of such as adhesives and paints.

The following examples are given for further illustration of the present invention, it being understood that these examples are not in limitation and that variations and modifications are possible so long as they do not depart from the spirit and scope of the invention and appended claims.

The intrinsic viscosity $[\eta]$ of the polymer in the examples were measured in toluene at 30° C. On the other hand, the microstructure of the polymer was determined by the infrared absorption spectrum.

EXAMPLES I–VI

A thoroughly dried 100-ml. ampoule was purged several times with nitrogen and then to this ampoule were added, in the order given, 38 ml. of dry methylene chloride, 5.4 grams of dry butadiene, 2 millimoles, based on the total Al, of a mixture mixed in advance and consisting of an equimolar quantity of ethylaluminum diethoxide and an alkylaluminum chloride indicated in Table I, below, and 0.005 millimole of a cobalt compound phosphine complex at 10° C., following which the ampoule was immediately melt-sealed. All of the foregoing operations were carried out in an atmosphere of nitrogen gas.

The reaction was then carried out for 5 hours by immersion of the ampoule in a polymerization bath controlled at 10° C. and in the meantime rotating the ampoule therein. This was followed by opening the ampoule and adding immediately thereto a toluene solution of phenyl-beta-naphthylamine to stop the reaction. The reaction mixture was then poured into an excess of a methanol-hydrochloric acid solution containing phenyl-beta-naphthylamine to decompose the catalyst and rendering it soluble, and at the same time the resulting polymer was precipitated. The precipitated polymer was isolated, washed several times with methanol containing phenyl-beta-naphthylamine and thereafter dried in vacuum overnight at 40° C.

The results obtained are shown in Table I.

TABLE I

| | Alkyl-aluminum chloride | Cobalt compound phosphine complex | Vinyl opening | | |
|---|---|---|---|---|---|
| | | | Yield, g. | configuration, percent | $[\eta]$ |
| Example: | | | | | |
| I | AlEt$_2$Cl* | CoBr$_2$[Ph$_3$P]$_2$** | 3.67 | 98 | 0.24 |
| II | AlEt$_{1.5}$Cl$_{1.5}$ | CoBr$_2$[Ph$_3$P]$_2$** | 2.11 | 86 | 0.18 |
| III | AlEtCl$_2$ | CoBr$_2$[Ph$_3$P]$_2$** | 2.15 | 80 | 0.51 |
| IV | AlEt$_2$Cl | CoBr$_2$[Et$_3$P]$_2$ | 1.08 | 98 | 0.08 |
| V | AlEt$_{1.5}$Cl$_{1.5}$ | CoBr$_2$[Et$_3$P]$_2$ | 4.29 | 99 | 0.13 |
| VI | AlEtCl$_2$ | CoBr$_2$[Et$_3$P]$_2$ | 4.38 | 99 | 0.12 |

\* Et represents ethyl group.
\*\* Ph represents phenyl group.

EXAMPLES VII–X 1,3-pentadiene was polymerized in accordance with the following polymerization recipe. The polymerization reaction was operated by the same procedure as in Examples I–VI.

The results obtained are shown in Table II.

Polymerization recipe 1,3-pentadiene—6.8 grams
Alkylaluminum alkoxide—1.0 millimole
Alkylaluminum chloride—1.0 millimole
Cobalt compound-phosphine complex—0.005 millimole
Methylene chloride—38 ml.
Polymerization temperature—10° C.
Polymerization time—1.5 hours

TABLE II

| | Alkyl-aluminum alkoxide | Alkyl-aluminum chloride | Cobalt compound phosphine complex | Vinyl opening Yield, g. | configuration, percent | [η] |
|---|---|---|---|---|---|---|
| Example: | | | | | | |
| VII | AlEt$_2$(OEt) | AlEt$_2$Cl | CoBr$_2$[Ph$_3$P]$_2$ | 0.75 | [1] 100 | 1.98 |
| VIII | AlEt$_2$(OEt) | AlEt$_{1.5}$Cl$_{1.5}$ | CoBr$_2$[Ph$_3$P]$_2$ | 1.92 | [1] 100 | 1.90 |
| IX | AlEt(OEt)$_2$ | AlEt$_2$Cl | CoBr$_2$[Et$_3$P]$_2$ | 0.62 | [1] 100 | 1.62 |
| X | AlEt(OEt)$_2$ | AlEt$_{1.5}$Cl$_{1.5}$ | CoBr$_2$[Et$_3$P]$_2$ | 1.88 | [1] 100 | 1.64 |

[1] When calculated from the NMR spectrum, it is 96–99%.

EXAMPLES XI–XXIV

Butadiene was polymerized in accordance with the following polymerization recipe. The polymerization reaction was operated by the same procedure as in Examples I–VI.

The results obtained are shown in Table III.

Polymerization recipe

Butadiene—5.4 grams
Methylene chloride—38 ml.
Alkylaluminum chloride—Varied amounts
Diethylaluminummonoethoxide—Varied amounts
Cobalt compound phosphine complex—0.005 millimole
Polymerization temperature—10° C.
Polymerization time—24 hours

TABLE III

| | Alkylaluminum chloride (mmol) | AlEt$_2$(OEt) (mmol) | Cobalt compound phosphine complex | Vinyl opening Yield, g. | Configuration, percent | [η] |
|---|---|---|---|---|---|---|
| Example: | | | | | | |
| XI | AlEt$_2$Cl, 0.5 | 1.5 | CoBr$_2$[Ph$_3$P]$_2$ | 0.37 | 79 | 0.11 |
| XII | AlEt$_2$Cl, 1.5 | 0.5 | CoBr$_2$[Et$_3$P]$_2$ | 0.49 | 99 | 0.07 |
| XIII | AlEt$_{1.5}$Cl$_{1.5}$, 1.66 | 0.33 | CoBr$_2$[Ph$_3$P]$_2$ | 0.30 | 99 | |
| XIV | AlEt$_{1.5}$Cl$_{1.5}$, 1.33 | 0.67 | Same as above | 0.92 | 99 | 0.10 |
| XV | AlEt$_{1.5}$Cl$_{1.5}$, 1.00 | 1.00 | do | 1.61 | 99 | 0.03 |
| XVI | AlEt$_{1.5}$Cl$_{1.5}$, 1.66 | 0.33 | CoBr$_2$[Et$_3$P]$_2$ | 0.10 | 84 | |
| XVII | AlEt$_{1.5}$Cl$_{1.5}$, 1.33 | 0.67 | Same as above | 0.37 | 80 | 0.15 |
| XVIII | AlEt$_{1.5}$Cl$_{1.5}$, 1.00 | 1.00 | do | 1.29 | 79 | 0.24 |
| XIX | AlEtCl$_2$, 1.75 | 0.25 | CoBr$_2$[Ph$_3$P]$_2$ | 0.11 | 85 | |
| XX | AlEtCl$_2$, 1.50 | 0.50 | Same as above | 0.50 | 81 | 0.19 |
| XXI | AlEtCl$_2$, 1.25 | 0.75 | do | 1.11 | 80 | 0.19 |
| XXII | AlEtCl$_2$, 1.75 | 0.25 | CoBr$_2$[Et$_3$P]$_2$ | 0.379 | 99 | |
| XXIII | AlEtCl$_2$, 1.50 | 0.50 | Same as above | 1.33 | 99 | 0.06 |
| XXIV | AlEtCl$_2$, 1.25 | 0.75 | do | 1.95 | 99 | 0.09 |

EXAMPLES XXV–XXVI

Butadiene was polymerized in accordance with the following polymerization recipe by the same procedure as in Examples I–VI. The results obtained are shown in Table IV.

Polymerization recipe

Butadiene—5.4 grams
Methylene chloride—38 ml.
Aluminum chloride—0.5 millimole
Diethylaluminum monoethoxide—1.5 millimole
Cobalt compound-phosphine complex—0.005 millimole
Polymerization temperature—10° C.
Polymerization time—24 hours

TABLE IV

| | Cobalt compound phosphine complex | Yield, g. | Vinyl opening configuration, percent | [η] |
|---|---|---|---|---|
| Example: | | | | |
| XXV | CoBr$_2$[Ph$_3$P]$_2$ | 1.76 | 80 | 0.30 |
| XXVI | CoBr$_2$[Et$_3$P]$_2$ | 3.32 | 99 | 0.06 |

EXAMPLES XXVII–XXX

Isoprene was polymerized in accordance with the following polymerization recipe by the same procedure as in Examples I–VI. The results obtained are shown in Table V.

Polymerization recipe

Isoprene—6.8 grams
Methylene chloride—38 ml.
AlEt$_2$Cl—1.5 millimoles
AlEt$_2$(OEt)—0.5 millimole
Cobalt compound-phosphine complex—0.005 millimole
Polymerization temperature—10° C.
Polymerization time—16 hours.

TABLE V

| | Cobalt compound phosphine complex | Yield, g. | Vinyl opening configuration, percent | [η] |
|---|---|---|---|---|
| Example: | | | | |
| XXVII | CoBr$_2$[Ph$_3$P]$_2$ | 0.26 | 62 | 0.37 |
| XXVIII | CoBr$_2$[Ph$_2$EtP]$_2$ | 0.33 | 65 | 0.19 |
| XXIX | CoBr$_2$[PhEt$_2$P]$_2$ | 0.34 | 68 | 0.38 |
| XXX | CoBr$_2$[Et$_3$P]$_2$ | 0.59 | 65 | 0.43 |

EXAMPLE XXXI

Isoprene was polymerized in accordance with the following polymerization recipe by the same procedure as in Examples I–VI.

Polymerization recipe

Isoprene—6.8 grams
Methylene chloride—38 ml.
AlCl$_3$—0.5 millimole
AlEt(OEt)$_2$—1.5 millimoles
CoBr$_2$[Et$_3$P]$_2$—0.005 millimole
Polymerization temperature—10° C.
Polymerization time—2 hours The yield of the resulting polymer was 2.14 grams, its [η] was 1.87 and content of vinyl opening configuration was 66%.

EXAMPLE XXXII

Butadiene was polymerized in accordance with the following polymerization recipe by the same procedure as in Examples I–VI. In this case, however, the phosphine was not used as a complex with the cobalt compound but was added separately to the polymerization system.

Polymerization recipe

Butadiene—5.4 grams
Methylene chloride—38 ml.
AlEt$_2$Cl—1 millimole
AlEt(OEt)$_2$—1 millimole
Cobalt bisacetylacetonate—0.005 millimole
Triethylphosphine—0.01 millimole
Polymerization temperature—10° C.
Polymerization time—5 hours The yield of the resulting polymer was 0.25 gram, and its [η] was 0.12 and content of the vinyl opening configuration was 88%.

EXAMPLE XXXIII 1,3-pentadiene was polymerized in accordance with the following polymerization recipe by the same procedure as in Examples I–VI. However, the phosphine was not used as a complex with the cobalt compound but was added separately to the polymerization system.

Polymerization recipe 1,3-pentadiene—6.8 grams
Methylene chloride—38 ml.
$AlEtCl_2$—1 millimole
$AlEt(OEt)_2$—1 millimole
Cobalt bisacetylacetonate—0.005 millimole
Triethylphosphine—0.01 millimole
Polymerization temperature—10° C.
Polymerization time—2 hours The yield of the polymer was 1.05 grams, while its [η] was 1.71 and its vinyl opening configuration content was 100% (96–99% according to NMR).

EXAMPLES XXXIV–XXXVI

Butadiene was polymerized in accordance with the following polymerization recipe by the same procedure as in Examples I–VI. In this case, the phosphine was not used as a complex with the cobalt compound but was added separately to the polymerization system.

Polymerization recipe

Butadiene—5.4 grams
Alkylaluminum chloride—1 millimole
$AlEt(OEt)_2$—1 millimole
Cobalt octenoate—0.005 millimole
Triphenylphosphine—Varied amounts
Methylene chloride—35 ml.
Polymerization temperature—10° C.
Polymerization time—18 hours

TABLE VI

| Example: | Alkyl aluminum chloride | Triphenyl phosphine, mmol | Yield, g. | Vinyl opening configuration, percent |
|---|---|---|---|---|
| XXXIV | $AlEt_2Cl$ | 0.04 | 3.53 | 99 |
| XXXV | $AlEtCl_2$ | 0.02 | 4.47 | 99 |
| XXXVI | $AlEtCl_2$ | 0.04 | 4.46 | 99 |

EXAMPLES XXXVII–XXXIX

Butadiene was polymerized in accordance with the following polymerization recipe by the same procedure as in Examples I–VI. The results obtained are shown in Table VII.

Polymerization recipe

Butadiene—5.4 grams
$AlEt_2Cl$—Varied amounts
$AlEt_2(OEt)$—Varied amounts
Cobalt compound phosphine complex—0.005 millimole
Chlorobenzene—38 ml.
Polymerization temperature—10° C.
Polymerization time—18 hours

TABLE VII

| Example: | $AlEt_2Cl$ (mmol) | $AlEt_2(OEt)$ (mmol) | Cobalt compound phosphine complex | Yield, g. | Vinyl opening configuration, percent |
|---|---|---|---|---|---|
| XXXVII | 1 | 1 | $CoBr_2[Ph_3P]_2$ | 0.86 | 87 |
| XXXVIII | 0.5 | 1.5 | $CoBr_2[Ph_3P]_2$ | 0.77 | 85 |
| XXXIX | 1 | 1 | $CoBr_2[Et_3P]_2$ | 0.13 | 93 |

EXAMPLES XL–XLI

Butadiene was polymerized in accordance with the following polymerization recipe by the same procedure as in Example I–VI. The results obtained are shown in Table VIII.

Polymerization recipe

Butadiene—5.4 grams
$AlEt_2F$—1 millimole
Alkylaluminum alkoxide—1 millimole
$CoBr_2[Ph_3P]_2$—0.005 millimole
Methylene chloride—38 ml.
Polymerization temperature—10° C.
Polymerization time—18 hours

TABLE VIII

| Example: | Alkyl aluminum alkoxide | Yield g. | Vinyl opening configuration, percent |
|---|---|---|---|
| XL | $AlEt_2(OEt)$ | 0.18 | 88 |
| XLI | $AlEt(OEt)_2$ | 0.12 | 87 |

EXAMPLES XLII–XLIII

Butadiene was polymerized in accordance with the following polymerization recipe by the same procedure as in Examples I–IV. However, the phosphine was not used as a complex with the cobalt compound but was added separately to the polymerization system.

Polymerization recipe

Butadiene—5.4 grams.
$AlEtCl_2$—1 millimole.
$AlEt(OEt)_2$—1 millimole.
Cobalt octenoate—0.005 millimole.
Phosphine—0.04 millimole.
Methylene chloride—35 ml.
Polymerization temperature—10° C.
Polymerization time—18 hours.

TABLE IX

| Example: | Phosphine | Yield, g. | Vinyl opening configuration, percent |
|---|---|---|---|
| XLII | $Ph_2PCl$ | 2.37 | 98 |
| XLIII | $Et_2PH$ | 1.21 | 80 |

EXAMPLE XLIV

Butadiene was polymerized in accordance with the following polymerization recipe by the same procedure as in Examples I–VI.

Polymerization recipe

Butadiene—5.4 grams.
Diisobutyl aluminum chloride—1 millimole.
$AlEt(OEt)_2$—1 millimole.
$CoBr_2[Ph_3P]_2$—0.005 millimole.
Methylene chloride—38 ml.
Polymerization temperature—10° C.
Polymerization time—18 hours.

The yield of the resulting polymer was 2.61 grams its [η] was 0.20 and content of the vinyl opening configuration was 85%.

EXAMPLES XLV–XLVI

Butadiene was polymerized in accordance with the following polymerization recipe by the same procedure as in Examples I–VI. The results are shown in Table X.

Polymerization recipe

Butadiene—5.4 grams.
$AlEtCl_2$—1 millimole.
Alkylaluminum alkoxide—1 millimole.
$CoBr_2[Ph_3P]_2$—0.005 millimole.

Methylene chloride—38 ml.
Polymerization temperature—10° C.
Polymerization time—18 hours.

TABLE X

| | Alkylaluminum alkoxide | Yield, g. | Vinyl opening configuration, percent |
|---|---|---|---|
| Example: | | | |
| XLV | Al (i-Bu)(OMe)₂*** | 1.61 | 80 |
| XLVI | AlEt(OMe)₂ | 1.85 | 82 |

*** Me and Bu represent methyl group and butyl group, respectively.

We claim:
1. A process for the preparation of an unsaturated hydrocarbon polymer having at least 60% of vinyl opening configuration, which comprises contacting an unsaturated hydrocarbon monomer of 4–10 carbon atoms of the formula

$$CH_2=CH—CR^1=CR^2R^3$$

wherein each of $R^1$, $R^2$ and $R^3$ is a member selected from the group consisting of hydrogen, alkyl groups of 1–6 carbon atoms and alkenyl groups of 2–6 carbon atoms, in a halogenated hydrocarbon solvent with a catalyst obtained by mixing
(a) a cobalt compound;
(b) a phosphine of the formula $$PR^4R^5R^6$$

wherein each of $R^4$, $R^5$ and $R^6$ is a member selected from the group consisting of alkyl, aryl, halogen and hydrogen;
(c) an organoaluminum derivative of the formula $$AlR^7_mX_{3-m}$$

wherein $R^7$ is alkyl, X is a member selected from the group consisting of chlorine and fluorine and $m$ is one of the numbers 0, 1, 1.5 and 2; and
(d) an alkoxy derivative of an organoaluminum compound of the formula $$AlR^8_n(OR^9)_{3-n}$$

wherein each of $R^8$ and $R^9$ is alkyl and $n$ is an integer from 1 to 2.

2. The process according to claim 1 wherein the unsaturated hydrocarbon monomer is a member selected from the group consisting of butadiene, isoprene and 1,3-pentadiene.

3. The process according to claim 1 wherein the unsaturated hydrocarbon monomer is contacted with the catalyst at a temperature of −30° to 100° C.

4. The process according to claim 1 wherein the amount of the catalyst employed is from 0.5 to 500 millimoles based on the amount of the total aluminum compounds per one mol of monomer.

5. A process for the preparation of an unsaturated hydrocarbon polymer having at least 60% of vinyl opening configuration, which comprises contacting an unsaturated hydrocarbon monomer of 4–10 carbon atoms of the formula $$CH_2=CH—CR^1=CR^2R^3$$

wherein each of $R^1$, $R^2$ and $R^3$ is a member selected from the group consisting of hydrogen, alkyl groups of 1–6 carbon atoms and alkenyl groups of 2–6 carbon atoms, in a halogenated hydrocarbon solvent with a catalyst obtained by mixing
(a) at least one cobalt compound selected from the group consisting of inorganic acid salts of cobalt, organic acid salts of cobalt and complex compounds of cobalt;
(b) a phosphine of the formula $$PR^4R^5R^6$$

wherein each of $R^4$, $R^5$ and $R^6$ is a member selected from the group consisting of alkyl, aryl, halogen and hydrogen;
(c) an organoaluminum derivative of the formula $$AlR^7_mX_{3-m}$$

wherein $R^7$ is alkyl, X is a member selected from the group consisting of chlorine and fluorine and $m$ is one of the numbers 0, 1, 1.5 and 2; and
(d) an alkoxy derivative of an organoaluminum compound of the formula $$AlR^8_n(OR^9)_{3-n}$$

wherein each of $R^8$ and $R^9$ is alkyl and $n$ is an integer from 1 to 2.

6. The process according to claim 5 wherein the cobalt compound is selected from the cobalt bromide, cobalt chloride, cobalt iodide, cobalt octenoate, cobalt naphtenate, cobalt bisacetyl acetonate and cobalt trisacetyl acetonate.

7. The process according to claim 5 wherein the phosphine is selected from the group consisting of triethylphosphine, triphenyl phosphine, diphenyl ethyl phosphine and phenyl diethyl phosphine.

8. The process according to claim 5 wherein the organoaluminum derivative is selected from the group consisting of diethyl aluminum chloride, ethyl aluminum sesquichloride, ethyl aluminum dichloride, aluminum chloride and diisobutyl aluminum chloride.

9. The process according to claim 5 wherein the alkoxy derivative of an organoaluminum compound is selected from the group consisting of diethyl aluminum monoethoxide and ethyl aluminum diethoxide.

10. The process according to claim 5 wherein the molar ratio of the organoaluminum derivative to the alkoxyderivative of an organoaluminum compound ranges between 1/9 and 9/1.

11. A process for the preparation of an unsaturated hydrocarbon polymer having atleast 60% of vinyl opening configuration, which comprises contacting an unsaturated hydrocarbon monomer of 4–10 carbon atoms of the formula $$CH_2=CH—CR^1=CR^2R^3$$

wherein each of $R^1$, $R^2$ and $R^3$ is a member selected from the group consisting of hydrogen, alkyl groups of 1–6 carbon atoms and alkenyl groups of 2–6 carbon atoms, in a halogenated hydrocarbon solvent with a catalyst obtained by mixing
(a) a complex compound represented by the general formula $$CoX_2(PR^4R^5R^6)_2$$

wherein X represents a halogen atom and $R^4$, $R^5$ and $R^6$ represent, respectively a member selected from the group consisting of an alkyl group, an aryl group a halogen atom and hydrogen atom;
(b) an organoaluminum derivative of the formula $$AlR^7_mX_{3-m}$$

wherein $R^7$ is alkyl, X is a member selected from the group consisting of chlorine and fluorine and $m$ is one of the numbers 0, 1, 1.5 and 2; and
(c) an alkoxy derivative of an organoaluminum compound of the formula $$AlR^8_n(OR^9)_{3-n}$$

wherein each of $R^8$ and $R^9$ is alkyl and $n$ is an integer from 1 to 2.

12. The process according to claim 11 wherein the molar ratio of the complex compound to the total aluminum compounds ranges between 1/50 and 1/5000.

13. The process according to claim 11 wherein the complex compound is selected from the group of cobalt bromide bistriethyl phosphine, cobalt bromide bistriphenyl phosphine, cobalt bromide bisdiphenyl ethyl phosphine, cobalt bromide bisphenyl diethyl phosphine, cobalt chloride bistriphenyl phosphine and cobalt chloride bistriethyl phosphine.

References Cited

UNITED STATES PATENTS

| | | | |
|---|---|---|---|
| 3,081,286 | 3/1963 | McKinnis | 260—93.7 |
| 3,242,099 | 3/1966 | Manyik et al. | 252—429 |
| 3,448,095 | 6/1969 | Dawans et al. | 260—94.3 |

FOREIGN PATENTS 1,156,239   10/1963   Germany.

JOSEPH L. SCHOFER, Primary Examiner

R. A. GAITHER, Assistant Examiner

U.S. Cl. X.R.

260—683.15